United States Patent
Korden et al.

(10) Patent No.: US 8,077,656 B2
(45) Date of Patent: Dec. 13, 2011

(54) FRONT END MODULE COMPRISING AN ANTENNA SWITCH

(75) Inventors: Christian Korden, Munich (DE); Christian Block, Stainz (AT); Kurt Wiesbauer, Deutschlandsberg (AT)

(73) Assignee: EPCOS AG, Munich (DE)

( * ) Notice: Subject to any disclaimer, the term of this patent is extended or adjusted under 35 U.S.C. 154(b) by 704 days.

(21) Appl. No.: 11/576,986

(22) PCT Filed: Oct. 7, 2005

(86) PCT No.: PCT/EP2005/010839
§ 371 (c)(1),
(2), (4) Date: Sep. 5, 2008

(87) PCT Pub. No.: WO2006/040093
PCT Pub. Date: Apr. 20, 2006

(65) Prior Publication Data
US 2009/0003286 A1    Jan. 1, 2009

(30) Foreign Application Priority Data
Oct. 12, 2004 (DE) .......................... 10 2004 049 684

(51) Int. Cl.
*H04W 4/00* (2009.01)

(52) U.S. Cl. ................... 370/328; 455/552.1; 455/553.1

(58) Field of Classification Search .................. None
See application file for complete search history.

(56) References Cited

U.S. PATENT DOCUMENTS

| | | | |
|---|---|---|---|
| 5,379,294 A * | 1/1995 | Ohtake et al. ................. | 370/295 |
| 5,815,804 A | 9/1998 | Newell et al. | |
| 6,975,271 B2 | 12/2005 | Adachi et al. | |
| 6,996,376 B2 | 2/2006 | Clifton | |
| 7,010,273 B2 | 3/2006 | Satoh et al. | |
| 7,127,269 B2 * | 10/2006 | Shih ............................ | 455/552.1 |
| 7,142,884 B2 * | 11/2006 | Hagn .......................... | 455/552.1 |
| 7,242,268 B2 | 7/2007 | Hagiwara et al. | |
| 7,349,717 B2 * | 3/2008 | Block et al. ................. | 455/552.1 |
| 7,580,727 B2 * | 8/2009 | Boyle et al. ................. | 455/552.1 |
| 2002/0032038 A1 | 3/2002 | Furutani et al. | |
| 2002/0090974 A1 * | 7/2002 | Hagn ............................ | 455/552 |
| 2004/0266378 A1 | 12/2004 | Fukamachi et al. | |
| 2005/0143023 A1 * | 6/2005 | Shih ............................. | 455/101 |
| 2006/0194550 A1 * | 8/2006 | Block et al. ..................... | 455/78 |

FOREIGN PATENT DOCUMENTS
EP       0 959 567       11/1999

(Continued)

OTHER PUBLICATIONS
Written Opinion with English translation for PCT/EP2005/010839.

(Continued)

*Primary Examiner* — Bob Phunkulh
(74) *Attorney, Agent, or Firm* — Fish & Richardson P.C.

(57) ABSTRACT

A front-end module is for use with at least three radio frequency bands. The front-end module includes at least five signal paths, and an antenna switch to electrically connect an antenna to one of the signal paths. At least one of the signal paths includes subpaths. A frequency separating network interfaces the at least one signal path to the subpaths. The subpaths are for use in passing different radio frequency bands. The different radio frequency bands have frequency ranges that do not overlap.

16 Claims, 4 Drawing Sheets

FOREIGN PATENT DOCUMENTS

| | | |
|---|---|---|
| EP | 1 418 680 | 5/2004 |
| EP | 1 453 135 | 9/2004 |
| EP | 1 557 944 | 7/2005 |
| JP | 2002-185356 | 6/2002 |
| JP | 2003-087150 | 3/2003 |
| JP | 2003-101440 | 4/2003 |
| JP | 2003-152588 | 5/2003 |
| JP | 2003-163606 | 6/2003 |
| JP | 2004-064597 | 2/2004 |
| JP | 2004-140696 | 5/2004 |
| JP | 2004-166258 | 6/2004 |
| JP | 2004-282727 | 10/2004 |
| WO | WO03/030386 | 4/2003 |

OTHER PUBLICATIONS

Search Report for PCT/EP2005/010839.

Examination report dated Jan. 13, 2009 with English translation from corresponding Japanese patent application.

English translation of Written Opinion of PCT/EP2005/010839.

* cited by examiner

FRONT END MODULE COMPRISING AN ANTENNA SWITCH

TECHNICAL FIELD

This patent application describes a front-end module with a front-end circuit that includes an antenna switch.

BACKGROUND

EP 0959567 describes a front-end circuit realized in a portable mobile radio device and designed for at least two mobile radio bands, with an antenna switch that alternately connects an antenna to two different signal paths. In one signal path, a multiplex type filter can be arranged, which has two bandpass filters and separates signals transmitted at different frequencies by guiding these signals to different subpaths provided for the different signals.

A radio band, which is characterized by its center frequency, is assigned to a radio system. The radio band can have transmission and receive bands, which are shifted in frequency and do not overlap. A multiband device is in the position to process data from different radio systems.

For separating mobile radio bands, it is known to arrange additional switches in the diverted signal paths after the first switch in the front-end circuit. The additional switches connect the subpaths of the diverted signal path to the antenna via a first switch.

SUMMARY

Described herein is a space-saving front-end module for at least 3 different radio bands with good electrical properties.

This patent application describes a front-end module (antenna switch module) designed for at least three radio bands with a front-end circuit, which has at least five signal paths and a single antenna switch constructed as a compact component. The antenna switch alternately establishes an electrically conductive antenna connection to one of the five or more signal paths. At least one of the signal paths is branched on the output side by a frequency separating network into two subpaths. The signals to be transmitted in the subpaths are assigned to two different radio bands without overlapping frequency ranges.

The center frequencies of these radio bands can differ, e.g., by about an octave, i.e., by approximately a factor of 2. The center frequencies of these radio bands can also differ by more than one octave. A radio system with a center frequency lower than the second radio system (e.g., WCDMA1900/2100, GSM1800/1900) is designated as the first radio system (e.g., WCDMA800, GSM850/900). WCDMA stands for Wideband Code Division Multiple Access, GSM stands for Global System Mobile, and the numbers connected to these designations stand for the center frequency of the corresponding mobile radio system in MHz.

A radio system like, e.g., GSM can transmit the data, for example, in the TDD mode (TDD=Time Division Duplexing), with transmit and receive signals transmitted alternately in time slices. A radio system such as, e.g., WCDMA can alternatively transmit the data in the FDD mode (FDD=Frequency Division Duplexing), with transmit and receive signals transmitted simultaneously but in different frequency bands. In the latter case, it is possible to transmit, e.g., via the same signal path or subpath, transmit and receive signals of the above radio system and to separate these signals from each other on the output side according to the access variant, e.g., by a downstream-connected duplexer or, as for the CDMA access variant, by a decoder.

The frequency separating network has two high-frequency filters whose passbands do not overlap. The frequency separating network can represent, e.g., a diplexer with a low-pass filter arranged in the first subpath and a high-pass filter arranged in the second subpath. The signals of the first radio system can be transmitted in the first subpath and the signals of the second radio system can be transmitted in the second subpath.

The frequency separating network can alternatively have a low-pass filter as the first filter and a bandpass filter as the second filter, with the passband of the second filter lying in the stopband of the first filter.

In another embodiment, the frequency separating network can have a high-pass filter as the first filter and a bandpass filter as the second filter, with the passband of the second filter lying in the stopband of the first filter.

In one embodiment, the switch module has n=5 or 6 signal paths, with the antenna switch being an SP5T or SP6T switch (SPnT=Single Pole n Through).

In one embodiment, the front-end module can be constructed as a multiband dual mode, specifically a multiband compressed dual mode, switch module for 5, 6 or more radio bands.

A decoder or the control logic of the switch can also be integrated into the compact component, which is may be suitable for surface mounting and in which the antenna switch is realized.

High-frequency filters can be arranged in the signal paths of the front-end circuit. A low-pass filter is may be arranged in a signal path or subpath which is functioning as the transmit path and which is assigned to the "low-frequency" first radio system (GSM850/900 or WCDMA800). A bandpass filter may be arranged in the signal path or subpath used as the transmit path of the "high-frequency" second radio band GSM1800/1900. Alternatively, a high-pass filter can be arranged in a signal path or subpath suitable for transmitting in the "high-frequency" second radio band (e.g., WCDMA 1900/2100).

The frequency separating network can separate transmit signals of a (first) radio system from the signals of the other radio system. The frequency separating network can also, however, separate receive signals of one radio system from the signals of the other radio system. In the latter case, simultaneous transmission and reception in the second bands and monitoring of the signals arriving in the first band are possible. The transmit signals of the system transmitted in the first ("low-frequency") and the second ("high-frequency") radio band, for example, of the GSM transmitter, can be led in a common signal path after the antenna switch and before the frequency separating network and can be separated from each other on the output side (after the frequency separating network) via another frequency separating network.

A bandpass filter can be arranged in a signal path or subpath designed as the receive path. The mentioned filters, in particular, bandpass filters, can have component structures working with acoustic waves (e.g., converters working with surface acoustic waves and/or thin-film resonators working with bulk acoustic waves). They can also be constructed, however, as MWK filters or as LC filters.

The front-end circuit is realized in a front-end module, which may be constructed as a single component with a carrier substrate, on which or in which the above components of the front-end circuit are arranged.

The component in which the antenna switch is integrated may be arranged on the carrier substrate. The carrier substrate may have several dielectric layers, made from ceramic, e.g., which are arranged between structured metal films. For example, it is possible to realize passive components, such as low-pass filters (e.g., transmit filters) or high-pass filters (e.g., receive filters), among others, as well as the components of the frequency separating network (low-pass filters, high-pass filters, bandpass filters) as structured printed conductors and to integrate these into the metal layers hidden in the interior of the substrate. The named low-pass, high-pass, and/or band-pass filters can also be provided as compact components, which can be surface-mounted on the carrier substrate.

A signal line connecting the antenna and the antenna switch can be arranged between these components. In one embodiment, a shunt path can be connected to this signal line with a protective element arranged in this path. The protective element protects the antenna switch from electrostatic discharges or overvoltages.

Embodiments are explained below with reference to associated figures. The figures show various embodiments with reference to schematic representations that are not true to scale. Parts that are identical or identical in function are designated with identical reference symbols.

DETAILED DESCRIPTION

Figure 1:
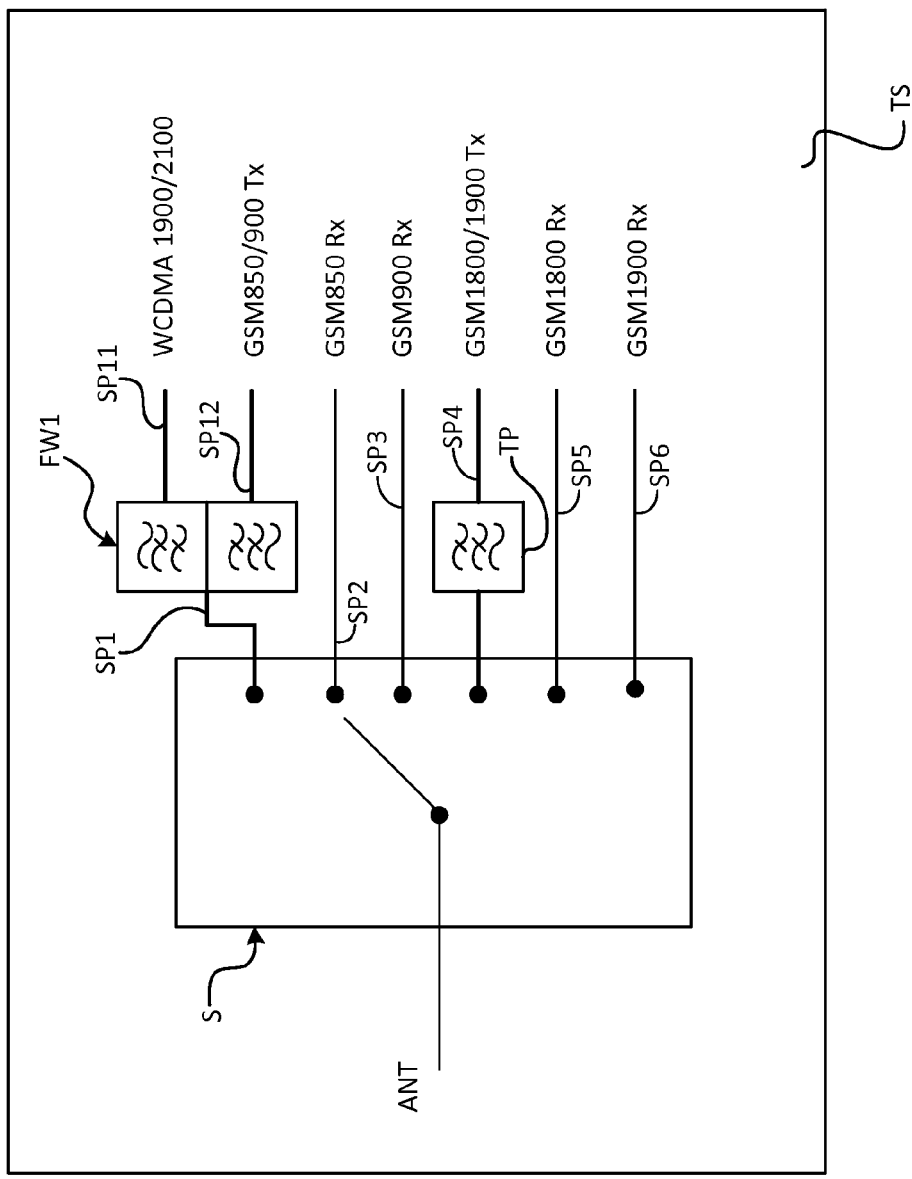
FIG. 1, a block-circuit diagram of a first front-end circuit with an antenna switch and a frequency separating network.
Figure 2:
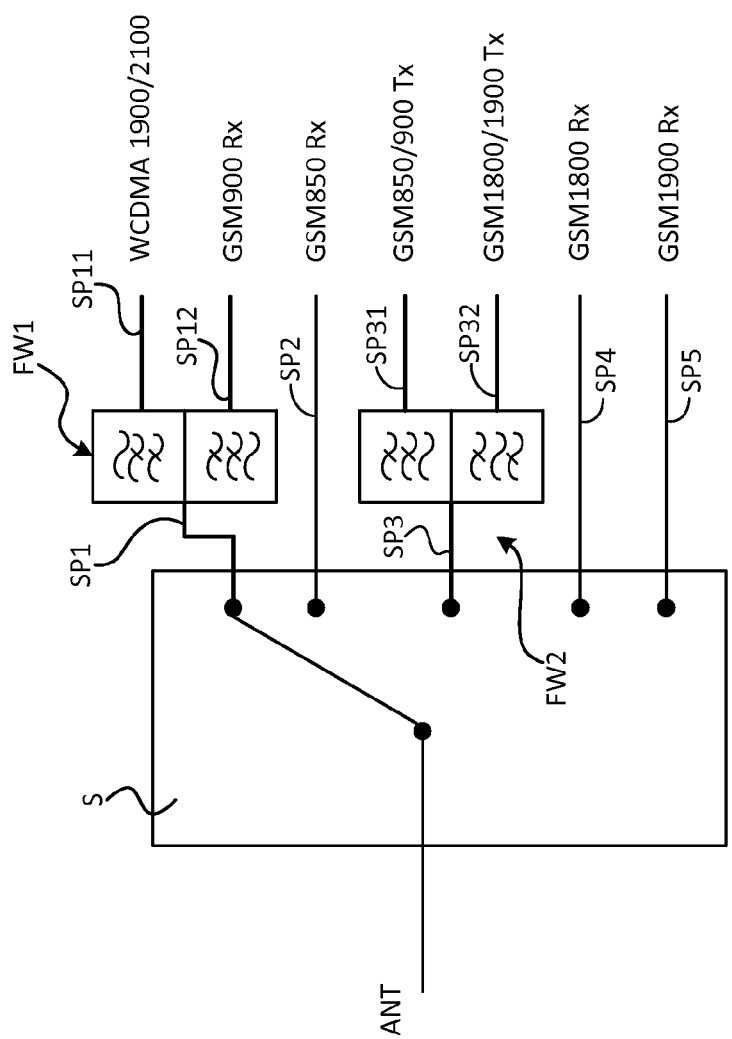
FIGS. 2, 3, a block-circuit diagram of a second front-end circuit with an antenna switch and two frequency separating networks.
Figure 3:
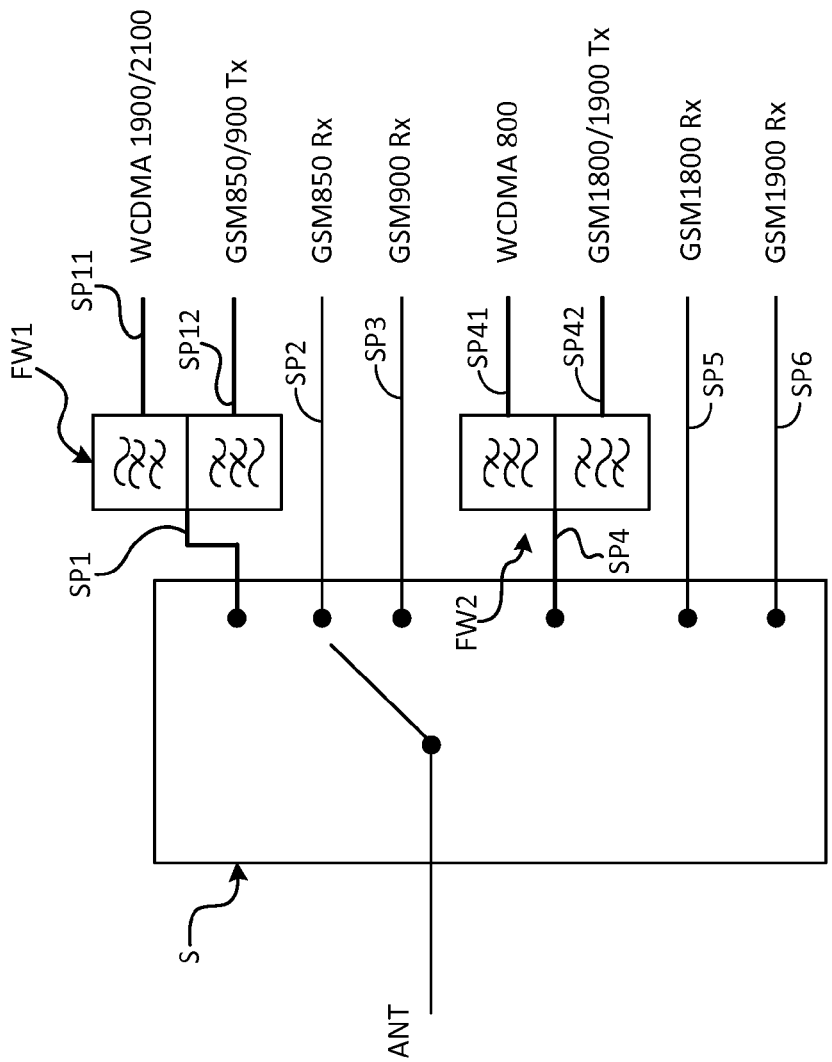

In FIG. 1, a five-band dual mode front-end module is shown. In FIG. 2, a five-band compressed dual mode front-end module is shown. In FIG. 3, a six-band dual mode front-end module is shown.

FIG. 1 shows a front-end circuit with an antenna switch S, which is realized in a front-end module on a carrier substrate TS, e.g., made from ceramic. The switch S is connected on the input side to an antenna connection ANT and on the output side to six signal paths SP1-SP6. The switch is constructed as an SP6T (Single Pole 6 Through) switch and thus as a 6-port switch.

A frequency separating network FW1, which has a high-pass filter and a low-pass filter, is arranged in the first signal path SP1. The frequency separating network FW1 separates the signal path SP1 into a first subpath SP11 and a second subpath SP12. The high-pass filter is arranged in the first subpath SP11 and the low-pass filter is arranged in the second subpath SP12. The low-pass filter of the frequency separating network FW1 is designed so that the surface waves of the GSM850/900 transmitter are simultaneously suppressed. The subpath with the high-pass filter may be used for a radio system transmitting in the (W)-CDMA mode. The transmit and receive signals of the latter system are separated from each other by a duplexer connected to the output of the high-pass filter (the low-pass filter in the signal path SP4 of FIG. 3). In this embodiment, the duplexer is not a component of the front-end module. The duplexer, not shown here, can also be integrated into the module.

The subpath SP 11 is assigned to the radio band WCDMA1900/2100 and the subpath SP12 is assigned to the joined transmit band GSM850/GSM900 Tx of the "low-frequency" radio bands GSM850 and GSM900.

The second signal path SP2 is assigned to the receive band GSM850 Rx of the radio band GSM850 and the third signal path SP3 is assigned to the receive band GSM900 Rx of the radio band GSM900. The fourth signal path SP4 is assigned to the joined transmit band GSM1800/GSM1900 Tx of the "high-frequency" radio bands GSM1800 and GSM1900. The fifth signal path SP5 is assigned to the receive band GSM1800 Rx of the radio band GSM1800 and the sixth signal path SP6 is assigned to the receive band GSM1900 Rx of the radio band GSM1900.

The low-pass filter, the high-pass filter of the frequency separating network FW1 and, e.g., a low-pass filter TP arranged in the signal path SP4 may each be realized in the interior of the carrier substrate TS. The switch S may be constructed as a chip with SMD contacts (SMD=Surface Mounted Device), mounted on the surface of the carrier substrate, and electrically connected to this substrate.

In FIG. 2, an embodiment of the front-end circuit with five signal paths SP1-SP5 is shown, in which another frequency separating network FW2 is arranged in the third signal path SP3. The third signal path SP3 is divided on the output side into two subpaths SP31 and SP32 by the frequency separating network FW2.

The frequency separating network FW2 here represents a combination of a low-pass filter arranged in the first subpath SP31 and a bandpass filter arranged in the second subpath SP32. The first subpath SP31 of the third signal path SP3 is assigned to the joined transmit band GSM850/GSM900 Tx of the "low-frequency" radio bands GSM850 and GSM900. The second subpath SP32 of the third signal path SP3 is assigned to the joined transmit band GSM1800/GSM1900 Tx of the "high-frequency" radio bands GSM1800 and GSM1900.

The second subpath SP12 of the first signal path SP1 in FIG. 2 is assigned to the receive band GSM900 Rx of the radio band GSM900.

By joining two subpaths SP11, SP12 into one signal path SP1, it is possible to transmit simultaneously the transmit and receive signals of the radio system WCDMA1900 (or WCDMA2100) and the transmit signals (FIG. 1) or receive signals (FIG. 2) of the other radio system GSM850 (or GSM900).

The possibility of receiving in the first radio band during the transmission in the second radio band (WCDMA1900/2100) has the advantage that a call arriving via the first radio band can be signaled during the transmission in the second radio band.

In FIG. 3, an embodiment is shown in which the signal paths SP1-SP3, SP5, and SP6 are constructed as in FIG. 1. In the fourth signal path SP4, in addition to the transmit signals of the radio band GSM1800/1900, the data of the radio system WCDMA800 can also be transmitted. The signals of the systems GSM1800/1900 and WCDMA800 are separated from each other by a frequency separating network FW2.

The frequency separating network FW2 represents in FIG. 3 a combination of a low-pass filter arranged in the first subpath SP41 and a bandpass filter arranged in the second subpath SP42. The first subpath SP41 of the fourth signal path SP4 is assigned to the "low-frequency" radio band WCDMA800. The second subpath SP42 of the fourth signal path SP4 is assigned to the joined transmit band GSM1800/GSM1900 Tx of the "high-frequency" radio bands GSM1800 and GSM1900.

A low-pass filter is arranged in the subpath SP41. A bandpass filter is arranged in the subpath SP42. In principle, it is possible to replace the bandpass filter arranged in the second subpath SP32 (FIG. 2) or SP42 (FIG. 3) with a high-pass filter.

Figure 4:
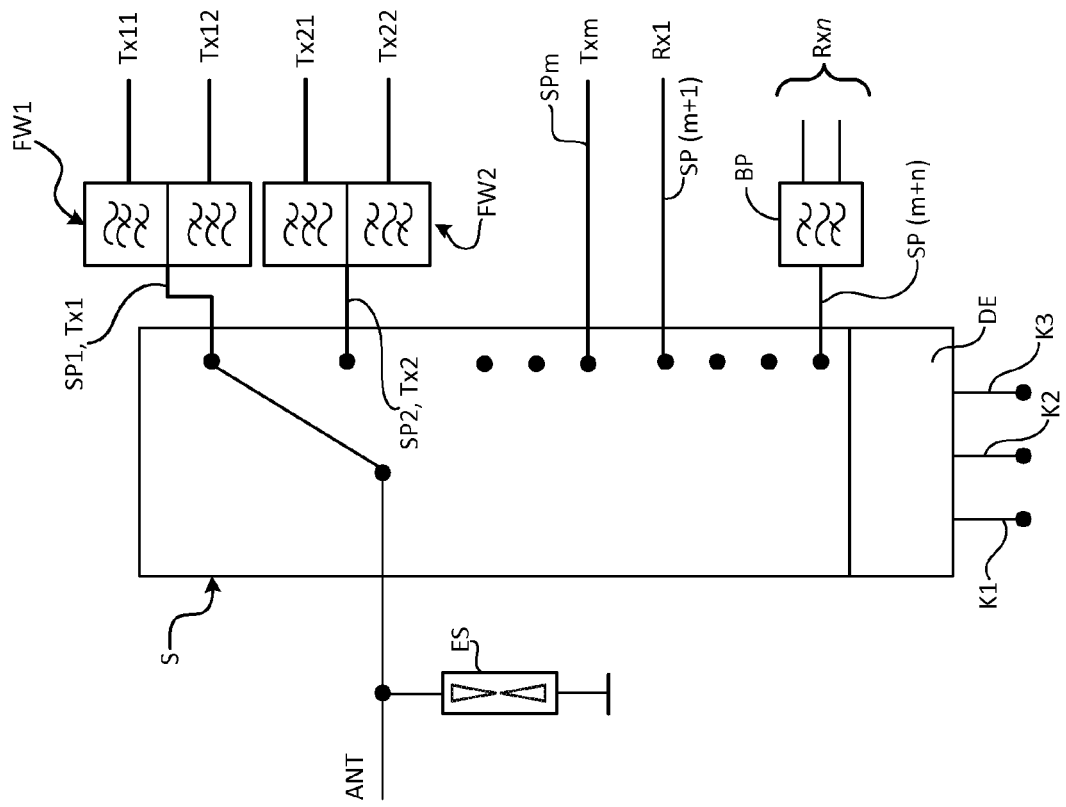
FIG. 4, a block-circuit diagram of a front-end circuit with a decoder integrated into the antenna switch.

In FIG. 4, a multiband multimode front-end module is shown. In this embodiment, in one component, in addition to the antenna switch S with connections for each (m+n) signal path SPj (j=1 ... (m+n)), a decoder DE with control connections K1, K2, and K3 is integrated, to which a digital control signal may be applied. According to the applied bit pattern, the switch S is controlled so that it connects a selected signal path to the antenna connection.

The component has m signal paths SPj=(j=1 ... m), which are constructed as transmit paths Tx1, Tx2 .... Txm, and n signal paths SPj (j=(m+1) ... (m+n)), which are designed as receive paths Rx1 ... Rxn.

The first signal path Tx1 is divided on the output side into subpaths Tx11 and Tx12, and the second transmit path Tx2 is divided into subpaths Tx21 and Tx22. A high-pass filter is arranged in the first subpath Tx11 of the first transmit path Tx1. The first subpath Tx11 may be assigned to a transmit band of a "high-frequency" second radio system, which may transmit in the FDD mode. A low-pass filter is arranged in the second subpath Tx12. The second subpath Tx12 may be assigned to a transmit band of a "low-frequency" first radio system, which transmits in the FDD or TDD mode.

A low-pass filter is arranged in the first subpath Tx21 of the second transmit path Tx2. The first subpath Tx21 may be assigned to a transmit band of a "low-frequency" fourth radio system, which may transmit in the FDD mode. A bandpass filter is arranged in the second subpath Tx22. The second subpath Tx12 may be assigned to a transmit band of a "high-frequency" third radio system, which transmits in the FDD or TDD mode.

A bandpass filter, which has an asymmetric (unbalanced) input and a symmetric (balanced) output, is arranged in the receive path Rxn. The bandpass filter thus fulfills the function of a balanced/unbalanced transformer. The bandpass filter can be, e.g., a receive filter working with surface acoustic waves.

Filters, such as bandpass filters, which can also be components of the front-end module, are usually arranged in the receive paths shown only as extracts in FIGS. 1-4.

Because frequency separating networks are arranged in several signal paths SP1, SP2, etc. in FIGS. 2-4 and a few signal paths, in particular Tx paths, are used in common for two or more adjacent frequency ranges, it is successful to operate, in particular, many radio bands with one front-end module, without in this way increasing the number of paths connected to the switch or the switching surface of the antenna switch.

In one embodiment, a frequency separating network can also represent a combination of a high-pass filter and a bandpass filter or a combination of two bandpass filters.

The antenna-side input of the antenna switch S can be protected, as in FIG. 4, from overvoltages by a protective element ES, e.g., a varistor or a spark gap, arranged in the shunt path.

In one embodiment, the antenna can be integrated into the carrier substrate of the front-end module. In another embodiment, the antenna is connected to the front-end module via an antenna connection.

The dielectric layers of the carrier substrate can include, e.g., an LTCC ceramic, an HTCC ceramic, or an organic material. The antenna switch—e.g., a semiconductor switch—can be selected from a GaAs switch (pHEMT or J-FET, FET=field-effect transistor) and a diode switch, e.g., with PIN diodes. The highly integrated switch can be constructed in CMOS technology on a silicon or sapphire substrate. The module can contain SAW or microwave ceramic duplexers arranged in the signal paths or subpaths. The duplexers may be arranged in the paths operated in the CDMA mode.

The decoder logic may be integrated directly on the semiconductor switch. In one embodiment, however, a separate decoder chip can be provided, which may be mounted on the carrier substrate.

The claims are not limited to the presented embodiments or the specified material selection. The elements shown in FIGS. 1-4 can be transferred without problem to any other embodiment. An electrostatic discharge (ESD) protection device can be arranged at any gate of the switch module. The semiconductor switch and the filters can be die-bonded or wire-bonded on the substrate or mounted in a flip-chip arrangement.

What is claimed is:

1. A front-end module for use with at least three radio frequency bands, the front-end module comprising:
   at least five signal paths;
   an antenna switch to electrically connect an antenna to one of the signal paths;
   wherein at least one of the signal paths comprises subpaths, a frequency separating network interfacing the at least one signal path to the subpaths;
   wherein the subpaths are for use in passing different radio frequency bands, the different radio frequency bands having frequency ranges that do not overlap;
   wherein the frequency separating network comprises a high-pass filter in a first subpath and a low-pass filter in a second subpath;
   wherein a center frequency of a first radio frequency band is lower, by approximately one octave or more, than a center frequency of a second radio frequency band;
   wherein the first subpath is a transmit path of the second radio frequency band; and
   wherein the second subpath is a transmit path of the first radio frequency band.

2. The front-end module of claim 1, wherein a second one of the signal paths comprises third and fourth subpaths, the front end-module further comprising:
   a low-pass filter in the third subpath; and
   a bandpass filter in the fourth subpath.

3. The front-end module of claim 2, further comprising:
   a shunt path with a protective element to protect the antenna switch against electrostatic discharges, the shunt path being electrically connected to a signal line connecting the antenna and the antenna switch.

4. The front-end module of claim 2, wherein there are five signal paths; and
   wherein the antenna switch comprises an SP5T switch.

5. The front-end module of claim 1, wherein the first subpath is for use in passing signals an FDD mode, and the second subpath is for use in passing signals a TDD mode.

6. The front-end module of claim 5, further comprising:
   a shunt path with a protective element to protect the antenna switch against electrostatic discharges, the shunt path being electrically connected to a signal line connecting the antenna and the antenna switch.

7. The front-end module of claim 5, wherein there are six signal paths; and
   wherein the antenna switch is an SP6T switch.

8. The front-end module of claim 1, wherein at least one of the subpaths is a receive path.

9. The front-end module of claim 1, wherein at least one of the subpaths is a transmit path.

10. The front-end module of claim 1, wherein the center frequency of the first radio frequency band is lower by more than one octave than the center frequency of the second radio frequency band.

11. The front-end module of claim 10, further comprising:
a shunt path with a protective element to protect the antenna switch against electrostatic discharges, the shunt path being electrically connected to a signal line connecting the antenna and the antenna switch.

12. The front-end module of claim 1, wherein the first subpath is for use in passing signals in two directions.

13. The front-end module of claim 1, further comprising:
a shunt path with a protective element to protect the antenna switch against electrostatic discharges, the shunt path being electrically connected to a signal line connecting the antenna and the antenna switch.

14. The front-end module of claim 1, wherein there are five signal paths; and
wherein the antenna switch comprises an SP5T switch.

15. The front-end module of claim 1, wherein there are six signal paths; and
wherein the antenna switch is an SP6T switch.

16. An apparatus comprising:
the front-end module of claim 1; and
a carrier substrate comprising ceramic on which the front-end module is disposed.

* * * * *